United States Patent
Yamazaki

(10) Patent No.: US 7,203,364 B2
(45) Date of Patent: Apr. 10, 2007

(54) IMAGE PROCESSING APPARATUS, IMAGE EDITING APPARATUS, IMAGE EDITING METHOD, AND IMAGE EDITING PROGRAM

(75) Inventor: Tsutomu Yamazaki, Odawara (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 843 days.

(21) Appl. No.: 09/942,171

(22) Filed: Aug. 30, 2001

(65) Prior Publication Data

US 2002/0031283 A1 Mar. 14, 2002

(30) Foreign Application Priority Data

Sep. 12, 2000 (JP) ............................. 2000-277052

(51) Int. Cl.
*G06K 9/34* (2006.01)

(52) U.S. Cl. ............... 382/177; 358/453; 358/462; 382/175; 382/176; 715/520

(58) Field of Classification Search ............... 358/1.16, 358/1.17, 1.18, 1.9, 1.11, 403, 447, 452–453, 358/462; 382/175, 176, 190, 218, 284, 311, 382/171–173, 177, 180–182, 201; 707/102; 715/505, 514, 517, 520, 526

See application file for complete search history.

(56) References Cited

U.S. PATENT DOCUMENTS

| | | | | |
|---|---|---|---|---|
| 4,627,707 A | * | 12/1986 | Tani et al. .................. 399/184 |
| 4,907,285 A | * | 3/1990 | Nakano et al. ............. 382/176 |
| 5,438,657 A | * | 8/1995 | Nakatani .................... 715/506 |
| 5,521,335 A | * | 5/1996 | Oka ......................... 178/18.01 |
| 5,555,362 A | * | 9/1996 | Yamashita et al. .......... 715/517 |
| 5,706,365 A | * | 1/1998 | Rangarajan et al. ........ 707/102 |
| 5,752,053 A | * | 5/1998 | Takakura et al. ........... 715/505 |
| 5,768,489 A | * | 6/1998 | Adachi et al. ............. 358/1.18 |
| 5,774,579 A | * | 6/1998 | Wang et al. ................ 382/176 |
| 5,802,535 A | * | 9/1998 | Shibuta ...................... 715/523 |
| 5,821,929 A | * | 10/1998 | Shimizu et al. ............ 382/190 |
| 5,907,631 A | * | 5/1999 | Saitoh ....................... 382/176 |
| 5,926,824 A | * | 7/1999 | Hashimoto ................. 715/520 |
| 5,995,659 A | * | 11/1999 | Chakraborty et al. ...... 382/176 |
| 6,043,823 A | * | 3/2000 | Kodaira et al. ............ 345/619 |
| 6,128,102 A | * | 10/2000 | Ota .......................... 358/403 |

(Continued)

FOREIGN PATENT DOCUMENTS

JP 05-089103 4/1993

(Continued)

*Primary Examiner*—Gregory Desire
(74) *Attorney, Agent, or Firm*—Buchanan Ingersoll & Rooney PC

(57) ABSTRACT

An image processing apparatus including a receiving unit, an extraction means, and a conversion means is disclosed. The receiving unit receives a first document data and a second document data obtained by reading respectively a first document and a second document each having at least one drawing. The extraction means extracts a first caption group for identifying the drawing contained in the first document and a second caption group for identifying the drawing contained in the second document. The conversion means converts the first caption group and the second caption group into a third caption group so that a character string in the first caption group does not overlap a character string in the second caption group.

22 Claims, 21 Drawing Sheets

U.S. PATENT DOCUMENTS

| | | | |
|---|---|---|---|
| 6,137,905 A * | 10/2000 | Takaoka | 382/173 |
| 6,163,623 A * | 12/2000 | Ohta | 382/176 |
| 6,249,353 B1 * | 6/2001 | Yoshida et al. | 358/1.9 |
| 6,341,176 B1 * | 1/2002 | Shirasaki et al. | 382/229 |
| 6,411,731 B1 * | 6/2002 | Saito | 382/173 |
| 6,466,954 B1 * | 10/2002 | Kurosawa et al. | 715/520 |
| 6,512,848 B2 * | 1/2003 | Wang et al. | 382/176 |
| 6,526,182 B2 * | 2/2003 | Morita | 382/284 |
| 6,539,116 B2 * | 3/2003 | Takaoka | 382/229 |
| 6,690,492 B2 * | 2/2004 | Nakajima | 358/462 |
| 6,735,740 B2 * | 5/2004 | Sakai et al. | 715/526 |
| 7,006,708 B1 * | 2/2006 | Nako et al. | 382/294 |

FOREIGN PATENT DOCUMENTS

| | | |
|---|---|---|
| JP | 08-255160 | 10/1996 |
| JP | 10-228473 | 8/1998 |
| JP | 11-085741 | 3/1999 |

* cited by examiner

FIG. 2A

| PAGE NUMBER | | | DRAWING IDENTIFICATION | | | DRAWING | |
|---|---|---|---|---|---|---|---|
| REPLACING CHARACTER STRING | DETECTED CHARACTER STRING | ADDRESS | POSITIONAL INFORMATION | REPLACING CHARACTER STRING | DETECTED CHARACTER STRING | ADDRESS | POSITIONAL INFORMATION |
| | | | | | | | |
| | | | | | | | |
| | | | | | | | |
| | | | | | | | |
| | | | | | | | |
| | | | | | | | |

FIG. 2B

| CAPTION | | INSERTION | | TEXT | |
|---|---|---|---|---|---|
| ADDRESS | POSITIONAL INFORMATION | ADDRESS | POSITIONAL INFORMATION | ADDRESS | POSITIONAL INFORMATION |
| | | | | | |
| | | | | | |
| | | | | | |
| | | | | | |
| | | | | | |
| | | | | | |

FIG. 6A

| REPLACING CHARACTER STRING | PAGE NUMBER | | | DRAWING IDENTIFICATION | | DRAWING | |
|---|---|---|---|---|---|---|---|
| | DETECTED CHARACTER STRING | ADDRESS | POSITIONAL INFORMATION | REPLACING CHARACTER STRING | DETECTED CHARACTER STRING | ADDRESS | POSITIONAL INFORMATION |
| | PAGE 1 | Padr 1 | ... | | Fig. 1 | Fadr 1 | ... |
| | | | | | Fig. 2 | Fadr 2 | ... |
| | | | | | Fig. 3 | Fadr 3 | ... |
| | PAGE 1 | Padr 2 | ... | | Fig. 1 | Fadr 4 | ... |
| | | | | | Fig. 2 | Fadr 5 | ... |

FIG. 6B

| CAPTION | | INSERTION | | TEXT | |
|---|---|---|---|---|---|
| ADDRESS | POSITIONAL INFORMATION | ADDRESS | POSITIONAL INFORMATION | ADDRESS | POSITIONAL INFORMATION |
| Nadr 1 | ... | Cadr 3 | ... | Cadr 1 | ... |
| Nadr 2 | ... | Cadr 2 | ... | | |
| Nadr 3 | ... | Cadr 4 | ... | | |
| Nadr 4 | ... | Cadr 6 | ... | Cadr 5 | ... |
| Nadr 5 | ... | Cadr 8 | ... | Cadr 7 | ... |
| | | Cadr 9 | ... | | |

FIG. 8A

| PAGE NUMBER | | | | DRAWING IDENTIFICATION | | DRAWING | |
|---|---|---|---|---|---|---|---|
| REPLACING CHARACTER STRING | DETECTED CHARACTER STRING | ADDRESS | POSITIONAL INFORMATION | REPLACING CHARACTER STRING | DETECTED CHARACTER STRING | ADDRESS | POSITIONAL INFORMATION |
| PAGE 1 | PAGE 1 | Padr 1 | ... | Fig. 1 | Fig. 1 | Fadr 1 | ... |
|  |  |  |  | Fig. 2 | Fig. 2 | Fadr 2 | ... |
|  |  |  |  | Fig. 3 | Fig. 3 | Fadr 3 | ... |
| PAGE 2 | PAGE 1 | Padr 2 | ... | Fig. 4 | Fig. 1 | Fadr 4 | ... |
|  |  |  |  | Fig. 5 | Fig. 2 | Fadr 5 | ... |

FIG. 8B

| CAPTION | | INSERTION | | TEXT | |
|---|---|---|---|---|---|
| ADDRESS | POSITIONAL INFORMATION | ADDRESS | POSITIONAL INFORMATION | ADDRESS | POSITIONAL INFORMATION |
| Nadr 1 | ... | Cadr 3 | ... | Cadr 1 | ... |
| Nadr 2 | ... | Cadr 2 | ... | | |
| Nadr 3 | ... | Cadr 4 | ... | | |
| Nadr 4 | ... | Cadr 6 | ... | Cadr 5 | ... |
| Nadr 5 | ... | Cadr 8 | ... | Cadr 7 | ... |
| | | Cadr 9 | ... | | |

FIG. 12A

| PAGE NUMBER | | | | DRAWING IDENTIFICATION | | DRAWING | |
|---|---|---|---|---|---|---|---|
| REPLACING CHARACTER STRING | DETECTED CHARACTER STRING | ADDRESS | POSITIONAL INFORMATION | REPLACING CHARACTER STRING | DETECTED CHARACTER STRING | ADDRESS | POSITIONAL INFORMATION |
|  | PAGE 1 | Padr 1 | ⋮ |  | Fig. 1 | Fadr 1' | ⋮ |
|  |  |  |  |  | Fig. 2 | Fadr 2' | ⋮ |
|  |  |  |  |  | Fig. 3 | Fadr 3' | ⋮ |
|  |  |  |  |  | Fig. 1 | Fadr 4' | ⋮ |
|  |  |  |  |  | Fig. 2 | Fadr 5' | ⋮ |

FIG. 12B

| CAPTION | | INSERTION | | TEXT | |
|---|---|---|---|---|---|
| ADDRESS | POSITIONAL INFORMATION | ADDRESS | POSITIONAL INFORMATION | ADDRESS | POSITIONAL INFORMATION |
| Nadr 1' | ... | Cadr 3' | ... | Cadr 1' | ... |
| Nadr 2' | ... | Cadr 2' | ... | | |
| Nadr 3' | ... | Cadr 4' | ... | | |
| Nadr 4' | ... | Cadr 6' | ... | Cadr 5' | ... |
| Nadr 5' | ... | Cadr 8' | ... | Cadr 7' | ... |
| | | Cadr 9' | ... | | |

FIG. 13A

| REPLACING CHARACTER STRING | PAGE NUMBER | | DRAWING IDENTIFICATION | | DRAWING | |
|---|---|---|---|---|---|---|
| | DETECTED CHARACTER STRING | ADDRESS | POSITIONAL INFORMATION | REPLACING CHARACTER STRING | DETECTED CHARACTER STRING | ADDRESS | POSITIONAL INFORMATION |
| PAGE 1 | PAGE 1 | Padr 1 | ... | Fig. 1 | Fig. 1 | Fadr 1' | ... |
| | | | | Fig. 2 | Fig. 2 | Fadr 2' | ... |
| | | | | Fig. 3 | Fig. 3 | Fadr 3' | ... |
| | | | | Fig. 4 | Fig. 1 | Fadr 4' | ... |
| | | | | Fig. 5 | Fig. 2 | Fadr 5' | ... |

FIG. 13B

| CAPTION | | INSERTION | | TEXT | |
|---|---|---|---|---|---|
| ADDRESS | POSITIONAL INFORMATION | ADDRESS | POSITIONAL INFORMATION | ADDRESS | POSITIONAL INFORMATION |
| Nadr 1' | ... | Cadr 3' | ... | Cadr 1' | ... |
| Nadr 2' | ... | Cadr 2' | ... | | |
| Nadr 3' | ... | Cadr 4' | ... | | |
| Nadr 4' | ... | Cadr 6' | ... | Cadr 5' | ... |
| Nadr 5' | ... | Cadr 8' | ... | Cadr 7' | ... |
| | | Cadr 9' | ... | | |

IMAGE PROCESSING APPARATUS, IMAGE EDITING APPARATUS, IMAGE EDITING METHOD, AND IMAGE EDITING PROGRAM

This application is based on Japanese Patent Application No. 2000-277052 filed on Sep. 12, 2000, the contents of which are hereby incorporated by reference.

BACKGROUND OF THE INVENTION

1. Field of the Invention

The invention relates to an apparatus, method and program for editing images.

2. Description of Related Art

Various editing methods are known for effectively using image data depending on the purpose of uses.

Japanese Patent Unexamined Publication No. 5-89103 (A) discloses a document editing and processing apparatus for automatically renumbering graphics numbers, drawing numbers and table numbers that are referred to in a document in the process of renumbering numbers in the vicinity of such graphics, drawings and tables in the document according to the editing such as addition, insertion, deletion and replacement of pages. In the apparatus, the numbers before editing, the new numbers, and the locations in a document of the graphics, drawings and tables are inputted by the user.

Japanese Patent Unexamined Publication No. 8-255160 (A) discloses an editing method for automatically laying out visually recognizable information such as characters, graphics, photographs and images within a specified area. The method provides a means of automatically adding layout information for displaying electronic image data on a display device.

Japanese Patent Unexamined Publication No. 10-228473 (A) discloses a method of automatically generating links between drawings such as diagrams and tables included in the image and the text related thereto, and converting them into hypertexts. The method includes the steps of detecting captions, detecting specified character strings related to drawings from the captions, and detecting character strings identical to the detected character strings from character areas to generate links between the character strings in the captions and the character strings in the character areas, based on the positional relations between the areas where the diagrams and tables exist and neighboring character areas. A caption is a character string provided in the vicinity of a drawing and contains notations or descriptions for identification the drawing.

Japanese Patent Unexamined Publication No. 11-85741 (A) discloses a method of editing for automatically laying out drawing numbers, which are a kind of notations for identification drawings, in optimum locations. In the method, the drawing numbers are automatically allocated to the drawings based on the setting of drawing number parameters.

On the other hand, when a plurality of documents are copied simultaneously, there can be several identical drawing numbers and page numbers. Consequently, the relations between the drawings and the drawing numbers as well as page orders can be confusing and contradictory. This makes it difficult to compiling documents and may lower the documents' values.

On the other hand, the apparatus disclosed by Publication No. 5-89103 requires the user to specify the information concerning renumbering, so that it places a heavy burden on the user. The method disclosed by Publication No. 8-255160 is intended for the layout of documents such as newspapers and magazines where drawing numbers are not indicated.

The method disclosed by Publication No. 10-228473 is simply using the existing drawing numbers. The method disclosed by Publication No. 11-85741 is to re-allocate drawing numbers. Therefore, these methods disclosed on the Publications cannot deal with the present problem.

SUMMARY OF THE INVENTION

A general object of the invention is to provide consistent relations between notations that identify drawings or pages and corresponding drawings or pages contained in a document produced by integrating several documents.

It is still more specific object of the invention to provide an image editing method including the steps of: (a) receiving a first document data and a second document data obtained by reading respectively a first document and a second document each having at least one drawing and a drawing number located in the vicinity of the drawing; (b) recognizing the drawing numbers from the first document data and the second document data; (c) changing corresponding data in the first document data and the second document data so that the recognized drawing numbers do not overlap each other; and (d) printing an image based on the changed first and second document data.

A further object of the invention is to provide an image editing method including the steps of: (a) receiving a first document data and a second document data obtained by reading respectively a first document and a second document each having a page number printed; (b) recognizing the page numbers from the first document data and the second document data; (c) changing corresponding data in the first document data and the second document data so that the recognized page numbers do not overlap each other; and (d) printing an image based on the changed first and second document data.

Still a further object of the invention is to provide an image processing apparatus including a receiving unit, an extraction means, and a conversion means. The receiving unit receives a first document data and a second document data obtained by reading respectively a first document and a second document each having at least one drawing. The extraction means extracts a first caption group for identifying the drawing contained in the first document and a second caption group for identifying the drawing contained in the second document. The conversion means converts the first caption group and the second caption group into a third caption group so that a character string in the first caption group does not overlap a character string in the second caption group.

Still a further object of the invention is to provide an image editing apparatus including a receiving unit, a recognizing means, a changing means, and a printing unit. The receiving unit receives a first document data and a second document data obtained by reading respectively a first document and a second document each having at least one drawing. The recognizing means recognizes the drawing numbers from the first document data and the second document data. The changing means changes corresponding data in the first document data and the second document data so that the recognized drawing numbers do not overlap each other. The printing unit prints an image based on the changed first and second document data.

Still a further object of the invention is to provide an image editing program for causing a computer to execute the procedures of: (a) receiving a first document data and a second document data obtained by reading respectively a first document and a second document each having at least one drawing and a drawing number located in the vicinity of the drawing; (b) recognizing the drawing numbers from the first document data and the second document data; (c) changing corresponding data in the first document data and the second document data so that the recognized drawing numbers do not overlap each other; and (d) printing an image based on the changed first and second document data.

The objects, characteristics, and advantages of this invention other than those set forth above will become apparent from the following detailed description of the preferred embodiments, which refers to the annexed drawings.

BRIEF DESCRIPTION OF THE DRAWINGS

FIG. 2A and FIG. 2B collectively illustrate an example allocation table used for consistency process for an image processing apparatus of the image processing system;

FIG. 6A and FIG. 6B collectively illustrate an example of the allocation table after the first correlating process is applied;

FIG. 8A and FIG. 8B collectively illustrate an example of the allocation table after the second correlating process is applied;

FIG. 12A and FIG. 12B collectively illustrate an example of the allocation table after the updating process;

FIG. 13A and FIG. 13B collectively illustrate an example of the allocation table after a second correlating process.

DETAILED DESCRIPTION OF THE EMBODIMENTS

The embodiments of this invention will be described below with reference to the accompanying drawings.

Figure 1:
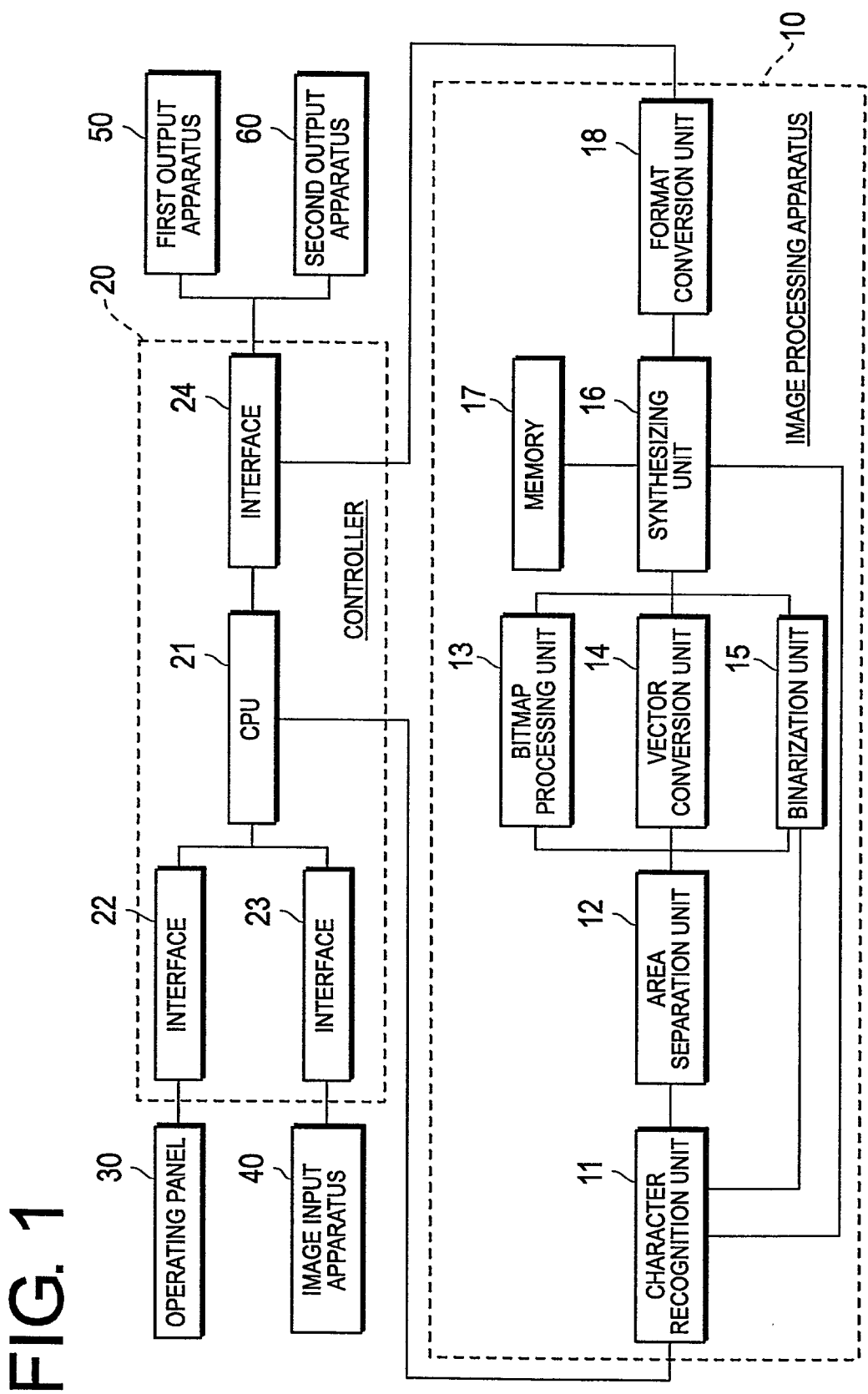
FIG. 1 is a block diagram of an image processing system related to the first embodiment according to the invention.

The image processing system of the first embodiment includes, as shown in FIG. 1, an image processing apparatus 10, a controller 20, an operating panel 30, an image input apparatus 40, a first output apparatus 50, and a second output apparatus 60.

The image processing apparatus 10 has a character recognition unit 11, an area separation unit 12, a bitmap processing unit 13, a vector conversion unit 14, a binarization unit 15, a synthesizing unit 16, a memory 17, and a format conversion unit 18.

The controller 20 has an interface 22 for the operating panel 30, an interface 23 for the image input apparatus 40, an interface 22 for the first output apparatus 50 and the second output apparatus 60, and a central processing unit (CPU) 21 that controls the interfaces 22 through 24.

The operating panel 30 is used by the operator for inputting instructions. The image input apparatus 40 is an image reading apparatus such as a color scanner. The first output apparatus 50 is an image forming apparatus such as a color printer, and the second output apparatus 60 is an apparatus for displaying and data processing the image data to be outputted, for example, a computer equipped with a display device.

Functions of each unit will be described in detail along the operation flow.

The user inputs the instruction information using the operating panel 30. The instruction information can be, for example, an operation start instruction or an instruction for a manual setting item.

Manual setting items include a consistency process instruction, a post-processing selection, a readout mode, and an output format selection.

The consistency process is a kind of editing function, and it is a process for providing a consistent relation between a drawing and a character string contained in a caption as a drawing identification description, or a description for identifying the drawing. The consistency process in the first embodiment, wherein a plurality of related documents (a first document and a second document) are copied simultaneously, is a process of generating a copied document (a third document) containing a group of captions with consistent descriptions for drawing identifications.

The drawing identification descriptions include, in addition to number notations, combination notations and relative position notations. The combination notations are, for example, notations consisting of numbers and alphabet characters such as 1A and 1B, as well as character strings meaning drawings and numbers such as FIG. 1 and FIG. 2 or FIG. 1 and FIG. 2. The relative position notations are, for example, "drawing on the right" and "drawing above."

In the consistency process according to the first embodiment, a consistent relation is given to a character string as a page number identification description or a description for identifying a page number. The page number identification descriptions include number notations and combination notations. The combination notations in this case are notations consisting of numbers and alphabet characters, e.g., "1A" and "1B," as well as character strings meaning pages and numbers, e.g., "P. 1" and "P. 2" or "PAGE 1" and "PAGE 2."

The post-processing selection is a mode for selecting the post-processing that is applied to the three types of areas that are separated in the character recognition unit 11 and the area separation unit 12, i.e., character areas, graphics areas, and photographic areas. The post-processing includes character coding at the character recognition unit 11, bitmap processing at the bitmap processing unit 13, vector conversion at the vector conversion unit 14, and binarization at the binarization unit 15.

The readout mode consists of the color mode for treating a document image as a color image and a monochromatic mode for treating a document image as a monochromatic image at the image input apparatus 40.

The output format selection is a mode for selecting the format of the output file to be prepared at the format conversion unit 18. The output formats are general-purpose file formats, e.g., the document file format, the page description language format, the file format for document display, and the file format for storing images.

For example, the document file format is the Rich Text Format, the page description language format is the PostScript (R), the file format for document display is the PDF (Portable Document Format), and the file format for storing images is either the JPEG (Joint Photographic Experts Group) or the TIFF (Tagged Image File Format).

The instruction information from the operating panel 30 is transmitted to the controller 20 via the interface 22.

As it receives instruction information for the manual setting items, the controller 20 inputs the manual setting items to the image processing apparatus 10. Furthermore, as it receives the operation start instruction, the controller 20 instructs the image input apparatus 40 to start reading images either in the color mode or in the monochromatic mode according to the readout mode setting.

The image input apparatus 40 reads the document image according to the operation start instruction from the controller 20. The generated image data is transmitted to the character recognition unit 11 of the image processing apparatus 10 via the interface 23 of the controller 20.

The character recognition unit 11 separates character areas from the image data and extract character images existing in the character areas. The image data left after removing the character images are inputted into the area separation unit 12. The character recognition unit 11 extracts character information including character code data and positional information, and color information from the character images.

The positional information includes X-Y coordinates, widths, lengths, etc. The character information is inputted into the synthesizing unit 16. When binarization is specified as the post-processing of the output area by the user, the character area is inputted into the binarization unit 15.

The area separation unit 12 separates graphics areas and photographic areas from the image data. The photographic area data will be added with positional information and will be inputted into the bitmap processing unit 13.

On the other hand, the data in the graphics area will be added with positional information and will be inputted into the vector conversion unit 14. If the post-processing is specified, the image data after area separation will be inputted into the bitmap processing unit 13 or the vector conversion unit 14 or the binarization unit 15 according to the details of specified matter.

The bitmap processing unit 13 applies the bitmap processing to the data in the photographic area. In the bitmap processing, the data of the photographic area is applied with various image processes such as the edge correction, the smoothing and the MTF correction. The bitmap information including the bitmap data and the positional information will be inputted into the synthesizing unit 16. The bitmap processing unit 13 will execute the similar process to the image data, to which the bitmap processing is specified as the post-processing.

The vector conversion unit 14 applies vector-conversion to the data in the graphics area to generate vector data. The vector data is inputted into the synthesizing unit 16 together with the attribute data. The vector conversion means converting graphics consisting of dots into vector data such as straight lines, arcs, Bezier curves, etc.

The attribute data are data obtained by extracting line widths, line types, line colors, end point styles, and colors of enclosed areas surrounded by vector data. The vector conversion unit 14 executes the similar process to image data, to which vector conversion is designated as the post-processing.

The binarization unit 15 binarizes the image data from the character recognition unit 11 and/or the area separation unit 12, when the binarization process is specified as the post-processing. The binarization data is inputted into the synthesizing unit 16 with the positional information.

The synthesizing unit 16 synthesizes the input data from the character recognition unit 11, the bitmap processing unit 13, the vector conversion unit 14, and the binarization unit 15. The synthesized data is converted into intermediate format data and inputted into the format conversion unit 18.

The intermediate format data are intermediate data between the synthesized data and the output format data, and are generated in order to facilitate the processing at the format conversion unit 18.

If the consistency process is specified, the synthesizing unit 16 provides consistent relations between drawings and character strings, which are the drawing identification descriptions using an allocation table. Similarly, the synthesizing unit 16 also provides consistent relations to character strings, which are page number identification descriptions.

The allocation table has, as shown in FIG. 2A and FIG. 2B, the page number section, the drawing identification section, the drawing section, the caption section, the insertion section, and the text section.

In the page number section, the detected character string as the existing page number identification description, memory address of the detected character string, the positional information of the detected character string, and the replacing character string for the detected character string are set up.

In the drawing identification section, the detected character string as the existing drawing identification description, and the replacing character string for the detected character string are set up. In the drawing section, memory address of the drawing, which corresponds to the drawing identification description, and the positional information of the drawing are set up.

In the caption section, memory address and the positional information of the caption are set up. The caption is the character string to be added in the vicinity of the drawing, and contains the drawing identification description.

In the insertion section, memory address and positional information of an insertion character string are set up. The insertion character string is the drawing identification description that exists in the character code data other than those of the character string concerning the caption.

In the text section, memory address and the positional information of the character code data other than those of the character string concerning the page number identification description and the caption are set up.

The memory 17 is used for storing the allocation table and the input data for and the synthesizing unit 16.

The format conversion unit 18 converts the intermediate format data into the data of the specified output format. The output format data is inputted into the first output apparatus 50 and/or the second output apparatus 60 via the interface 24.

As an example, the first output apparatus 50 prints the data on paper, and the second output apparatus 60 stores the data and displays it on the monitor.

Next, the consistency process will be described referring to the flow chart shown in FIG. 3.

First, character areas are separated from the image data (step S1), and the character information is extracted from character images in the character areas (step S2). The image data, from which the character images are removed, are interpolated using the peripheral pixels of the character images (step S3).

Then, photographic areas and graphics areas are separated from the image data (step S4). The photographic area data are treated by the bitmap process, and the graphics area data are treated by the vector conversion process (step S5).

After that, the first correlating process concerning the allocation table is executed based on the character information, the bitmap information, and the vector data (step S6).

The first correlating process is a process of detecting character strings, which are the existing drawing identification descriptions, based on the captions added in the vicinity of the drawings included in a document, extracting the positional information of the detected character strings from the character information containing the captions, and determining the corresponding relations between the detected character strings, the positional information of the detected character strings and the drawings.

The character strings, which are the existing page number identification descriptions, are also detected similarly.

Next, a judgment is made whether there is a next page image data (step S7). If it is judged that there is a next page, the process returns to the step S1. If the next page does not exist, or if the process of the last page is completed, the second correlating process concerning the allocation table is executed (step S8).

The second correlating process is a process of generating character strings, which are the drawing identification descriptions for uniquely identifying the drawings, and replacing the detected character strings, which are the existing drawing identification descriptions, with the generated character strings, based on the corresponding relations obtained in the first correlating process.

In addition, character strings for uniquely identifying the page numbers are also generated similarly and the character strings, which are the existing page number identification descriptions, are replaced with the character strings.

Then, image data is synthesized based on the allocation table obtained (step S9), and the image data is converted into the intermediate format data (step S10). The intermediate format data is converted into the specified output format data and outputted (step S11, 12).

Lastly, a judgment is made whether there is a next page image data (step S13). If it is judged that there is a next page, the process returns to the step S9. If the next page does not exist, or if the process of the last page is completed, the process will be terminated.

Next, the first correlating process will be described referring to the flow chart shown in FIG. 4.

First, candidates of the character strings, which are the page number identification descriptions, are extracted from the character code data (step S61). Then, the character strings, which are the page number identification descriptions, are detected based on the positional information of the candidates (step S62).

The data of the detected character strings are stored in the memory 17 (step S63). The detected character strings, the memory addresses of the detected character strings, and the positional information of the detected character strings are set up in the page number section of the allocation table (step S64).

After that, candidates of the character strings, which are the drawing identification descriptions, are extracted from the character code data (step S65).

Next, captions are detected based on the coordinate position of the character area where the candidates exist, the number of rows, width and height of the character area, and whether there are any photographic areas or graphics areas exist in the neighborhoods, and the candidates that belong to the caption are detected as the character strings, which are the drawing identification descriptions (step S66).

The data of the captions are stored in the memory 17 (step S67). The detected character strings are set up in the drawing identification sections of the allocation table (S68), and the memory addresses and the positional information of the caption are set up in the caption section (step S69).

Next, drawings that correspond to the captions are detected based on the bitmap data of the photographic areas or the vector data of the graphics areas located in the vicinities of the coordinate positions of the captions (step S70). The detected drawings' data are stored into the memory 17 (step S71).

The memory address and the positional information of the detected drawings are set in the drawing section of the allocation table in correlation with the drawing identification descriptions (step S72).

The data of the remaining drawings consisting of bitmap data and/or vector data that is not correlated to the caption are stored in the memory 17 (step S73). The memory address and positional information of the remaining drawings are set up in the drawing section of the allocation table without being correlated to the drawing identification descriptions (step S74).

Next, the character code data of the character area, other than the character strings related to the page number identification descriptions and captions, is stored into the memory 17 (step S75). The memory address and positional information of the character code data is set up in the text section of the allocation table (step S76).

Then, the insertion character strings, which are the drawing identification descriptions inserted in the character area, i.e., the drawing identification descriptions existing in the character code data are detected (step S77).

The data of the insertion character strings is stored in the memory 17 (step S78). The memory address and the positional information of the insertion character string are set up in the insertion section of the allocation table in correlation with the drawing identification description (step S79).

Figure 5A:
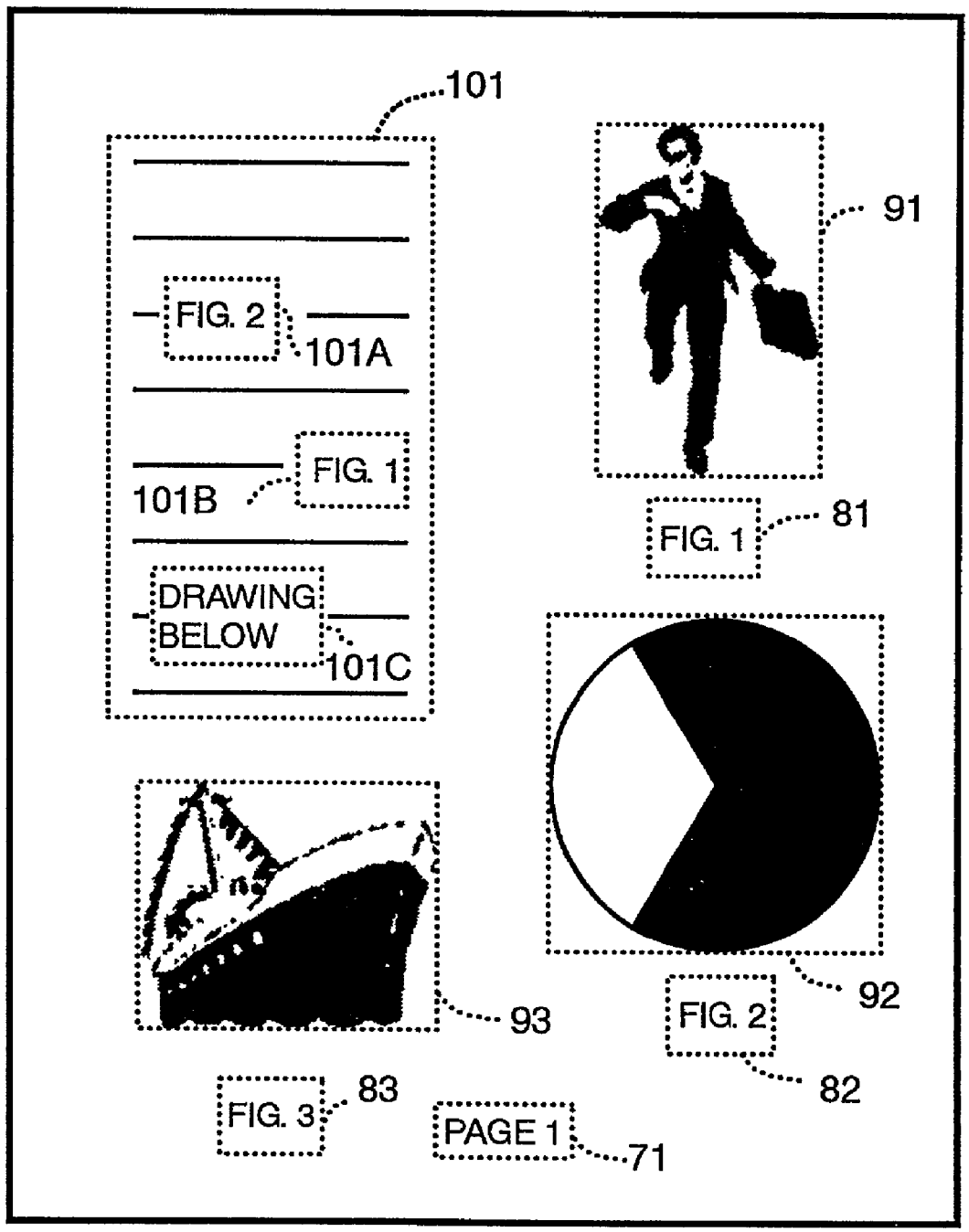
FIGS. 5A and 5B are example images of first and second pages as input images to which the consistency process is applied.
Figure 5B:
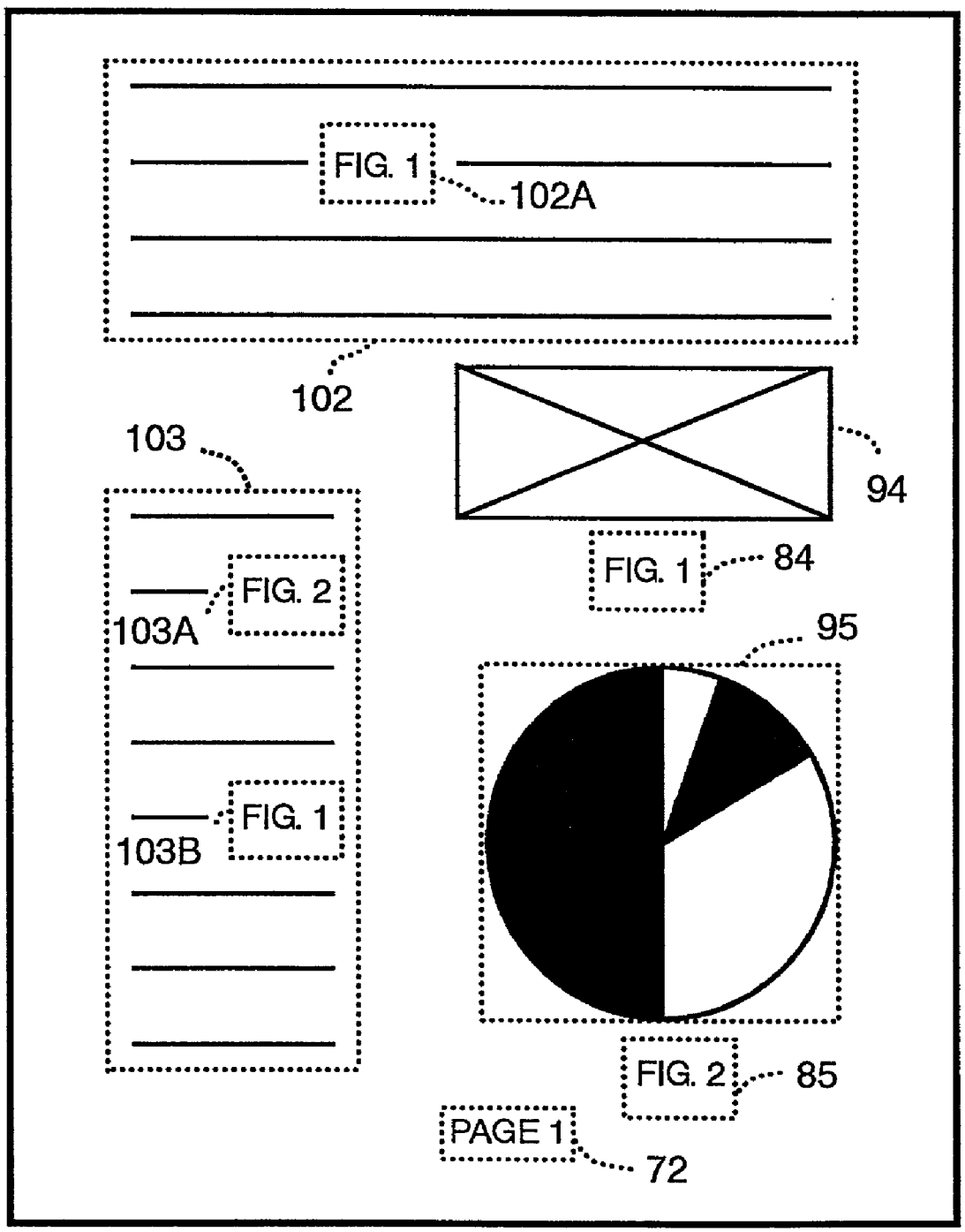

Next, the first correlating process will be concretely described using the first page image shown in FIG. 5A and the second page image shown in FIG. 5B.

The data of the character string 71, which is the page number identification description of the first page, and the data of the character string 72, which is the page number identification description of the second page, are stored in the first memory area of the memory 17, which is the memory area for storing the page number identification descriptions.

"PAGE 1" and "PAGE 2" that correspond to the character strings 71 and 72 are set in the detected character strings of the page number section. The starting address of the character string 71 is indicated as Padr1, and the starting address of the character string 72 is indicated as Padr2.

The character strings 81, 82 and 83, which are the captions of the first page, and the character strings 84 and 85, which are the captions of the second page, are stored in the second memory area of the memory 17, which is a memory area for preserving the captions.

Figure 3:
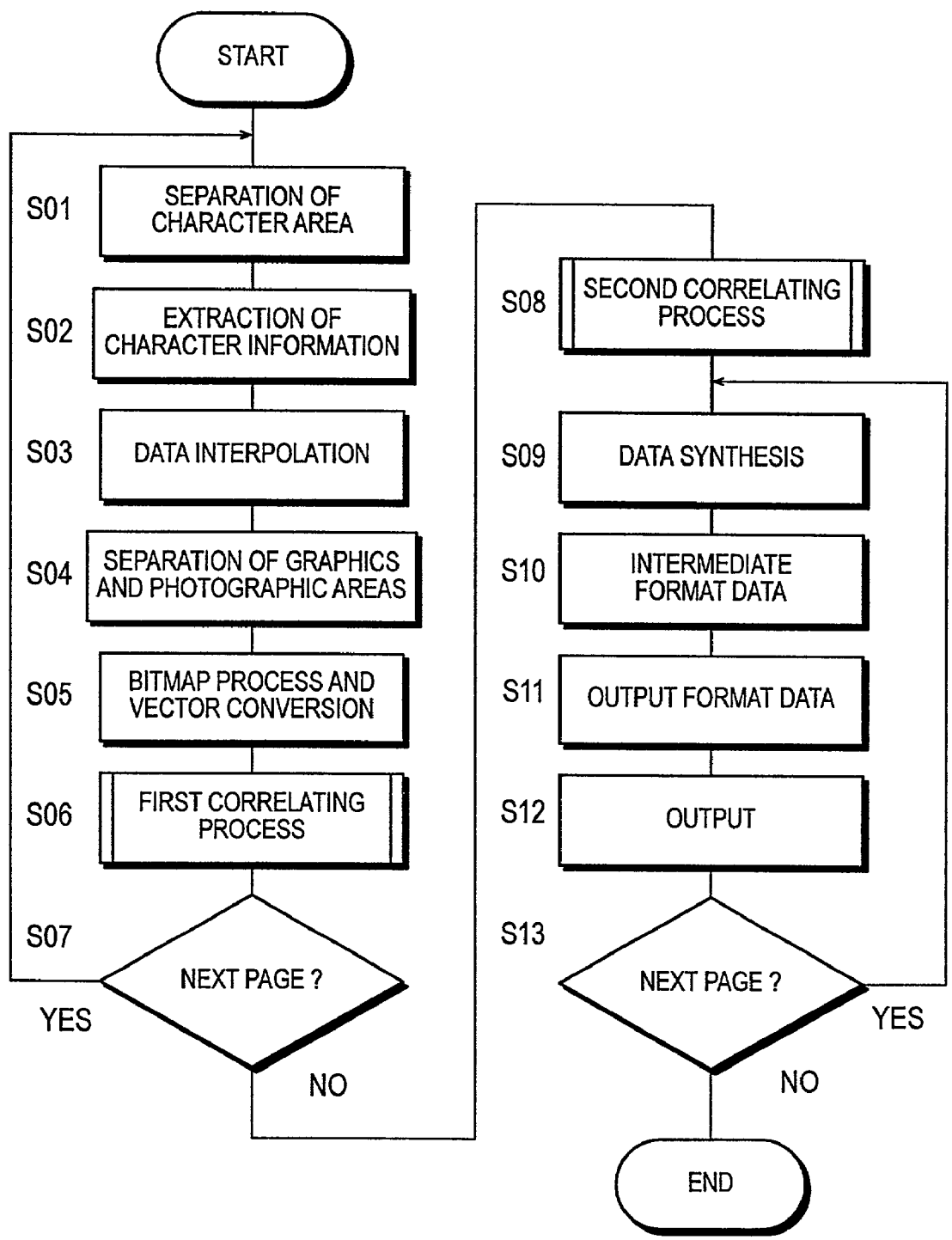
FIG. 3 is a flow chart of the consistency process.

"FIG. 1," "FIG. 2," "FIG. 3," "FIG. 1," "FIG. 2," which correspond to the character strings 81 through 85, are set in the detected character strings of the drawing identification section. The starting addresses of the character strings 81, 82 and 83 are indicated by Nadr1, Nadr2 and Nadr3, and the starting addresses of the character strings 84 and 85 are indicated by Nadr4 and Nadr5.

The data of the drawings 91, 92 and 93, which correspond to the captions of the first page, and the data of the drawings 94 and 95, which correspond to the captions of the second page, are stored in the third memory area of the memory 17, which is the memory area for storing the drawing data.

Furthermore, the drawings 91, 92, 93, 94 and 95, are correlated to "FIG. 1," "FIG. 2," "FIG. 3," "FIG. 1," and "FIG. 2." The starting addresses of the drawings 91, 92 and 93 are indicated by Fadr1, Fadr2 and Fadr3, and the starting addresses of the drawings 94 and 95 are indicated by Fadr4 and Fadr5.

The data of the character area 101 and the insertion character strings 101A, 101B and 101C of the first page, and the data of the character areas 102, 103 and the insertion character strings 102A, 103A and 103B of the second page are stored in the fourth memory area of the memory 17. Furthermore, the insertion character strings 101A, 101B, 101C, 102A, 103A and 103B are correlated to "FIG.2," "FIG.1," "drawing below," "FIG. 2," and "FIG. 1."

The starting address of the character area 101 of the first page is indicated by Cadr1, and the starting addresses of the insertion character string 102A, 103A and 103B are indicated by Cadr2, Cadr3 and Cadr4. The starting address of the character area 102 on the top of the second page is indicated by Cadr5, and the starting address of the insertion character string 102A is indicated by Cadr6.

The starting address of the character area 103 on the bottom of the second page is indicated by Cadr7, and the starting addresses of the insertion character strings 103A and 103B are indicated by Cadr8 and Cadr9.

Consequently, the data such as shown in FIG. 6A and FIG. 6B is set on the allocation table.

Figure 7:
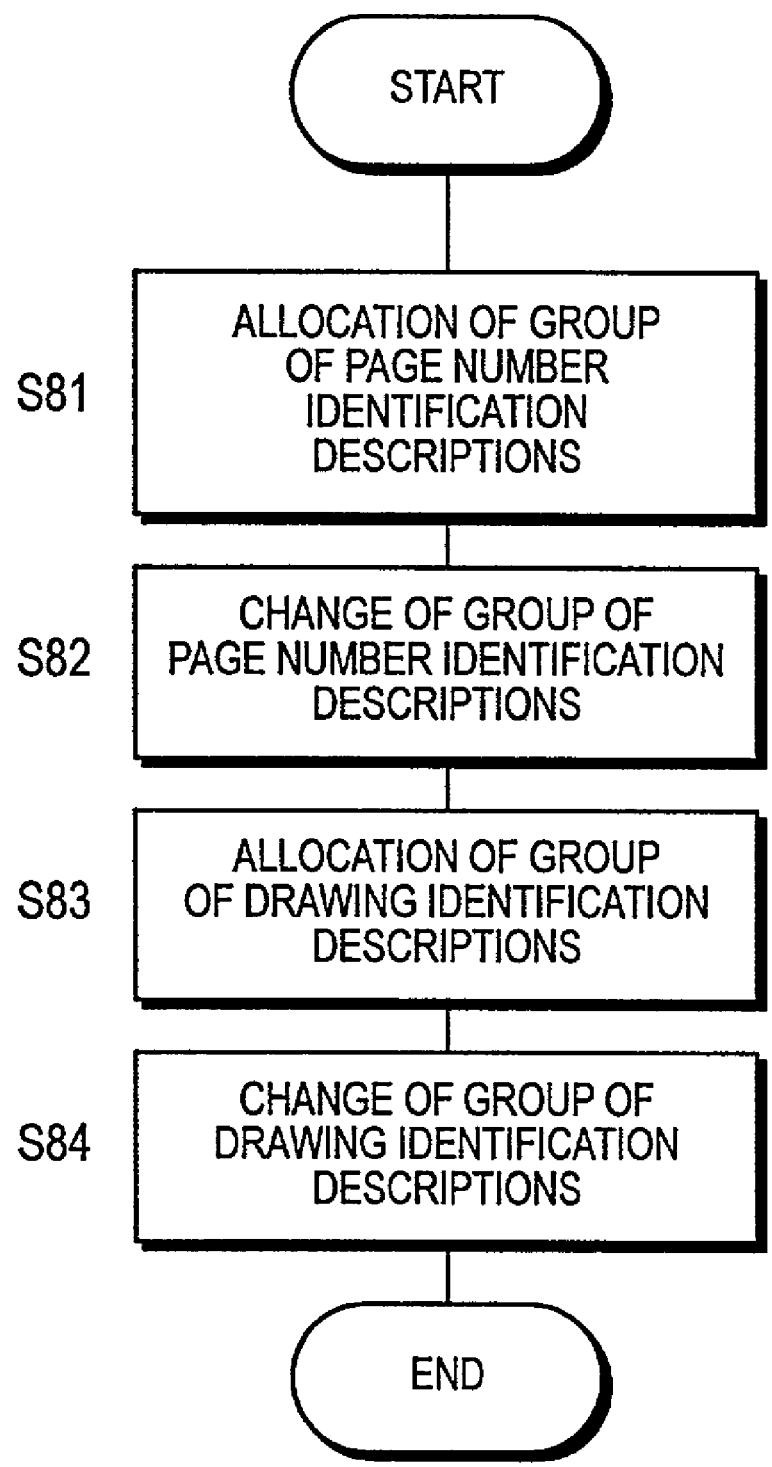
FIG. 7 is a flow chart of a second correlating process in the consistency process.

Next, the second correlating process will be described referring to the flow chart shown in FIG. 7.

First, a group of unique page number identification descriptions numbered in an ascending order is allocated to the replacing character strings of the page number section (step S81). Then, the data indicated by the memory addresses in the page number section are changed to the allocated group of page number identification descriptions (step S82).

Next, a group of unique drawing identification descriptions numbered in an ascending order is allocated to the replacing character strings of the drawing identification section (step S83). Then, the data indicated by the memory addresses in the caption section are changed to the allocated group of drawing identification descriptions (step S84).

Figure 9A:
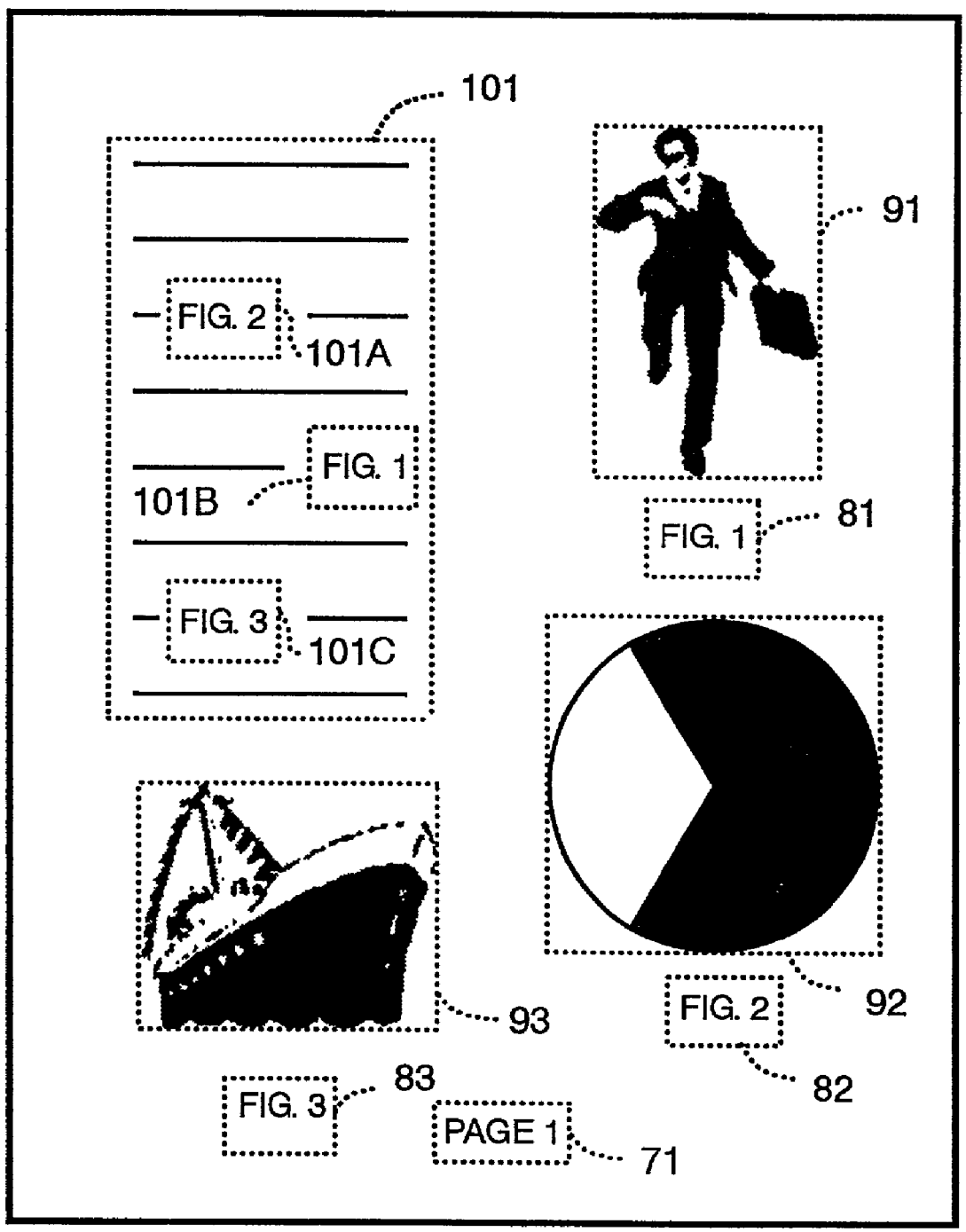
FIGS. 9A and 9B are example output images after the consistency process is applied, corresponding to FIGS. 5A and 5B respectively.
Figure 9B:
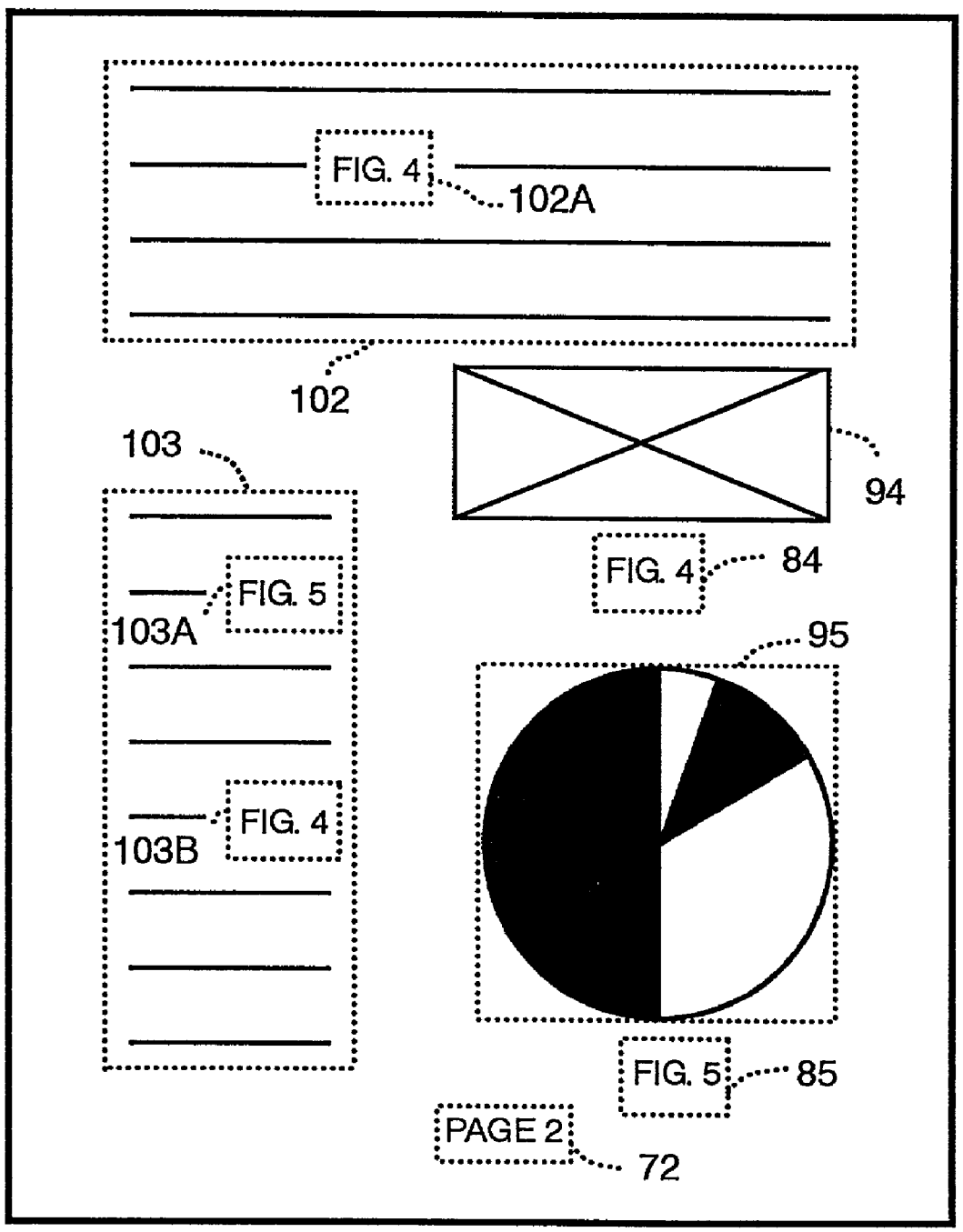

Consequently, the allocation table shown in FIG. 8A and FIG. 8B is obtained. Reading the data from the memory 17 and synthesizing them based on the allocation table, an output image having groups of consistent captions and page number identification descriptions is obtained as shown in FIG. 9A and FIG. 9B.

More specifically, the insertion character string 101C, "drawing below," on the first page is replaced by the character string, "FIG. 3." The insertion character string 72, "PAGE 1," as the page number identification description on the second page is replaced by the character string, "PAGE 2," and the character strings 84 and 85, "FIG. 1" and "FIG. 2," as the captions on the second page are replaced by the character strings, "FIG. 4" and "FIG. 5."

Figure 4:
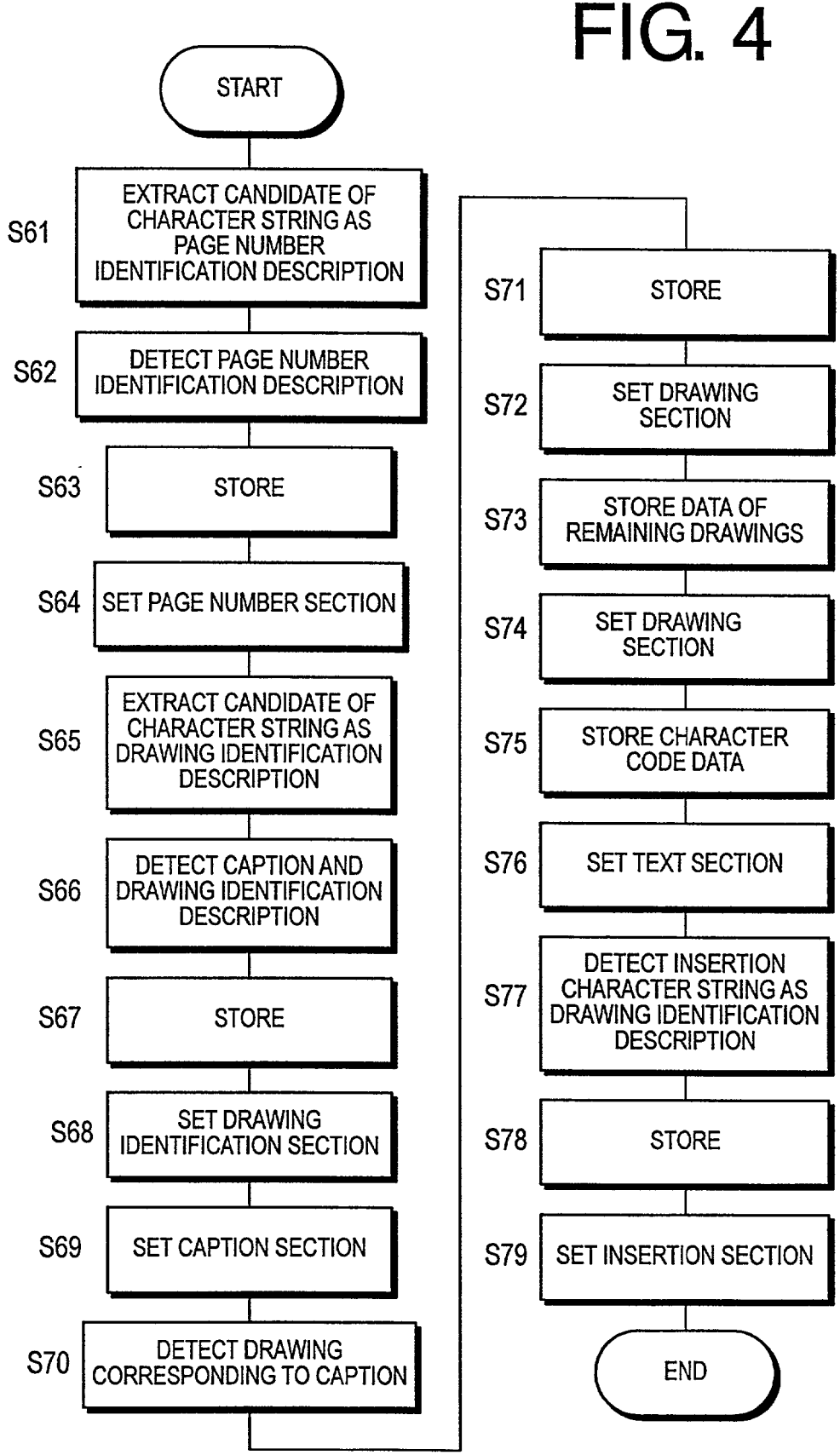
FIG. 4 is a flow chart of a first correlating process in the consistency process.

The insertion character strings 102A, 103A and 103B, "FIG. 1," "FIG. 2" and "FIG. 1," of the second page are replaced by the character strings, "FIG. 4," "FIG. 5" and "FIG. 4" respectively.

As can be seen from the above, the first embodiment of the invention can provide a consistent relation between the drawings and the character strings contained in the captions, which are the drawing identification descriptions.

It is possible to obtain a copied document that contains a group of captions having consistent drawing identification descriptions from documents containing the same drawing identification descriptions. Accordingly, the document filing work is simplified and the value of the document increases.

Moreover, since the process applied on the page number identification descriptions is similar to the one that is applied on the drawing identification descriptions in the first embodiment, it is possible to obtain a copied document with a group of consistent page number identification descriptions from base documents containing the same page number identification descriptions.

Next, the second embodiment will be described.

The consistency process in the second embodiment relates to editing processes that accompany layout changes that unite several document image data in case of copying. The layout change process mentioned here is, for example, the N-in-1 process. Therefore, the second embodiment is different from the first embodiment in the function of the synthesizing unit 16.

Figure 10:
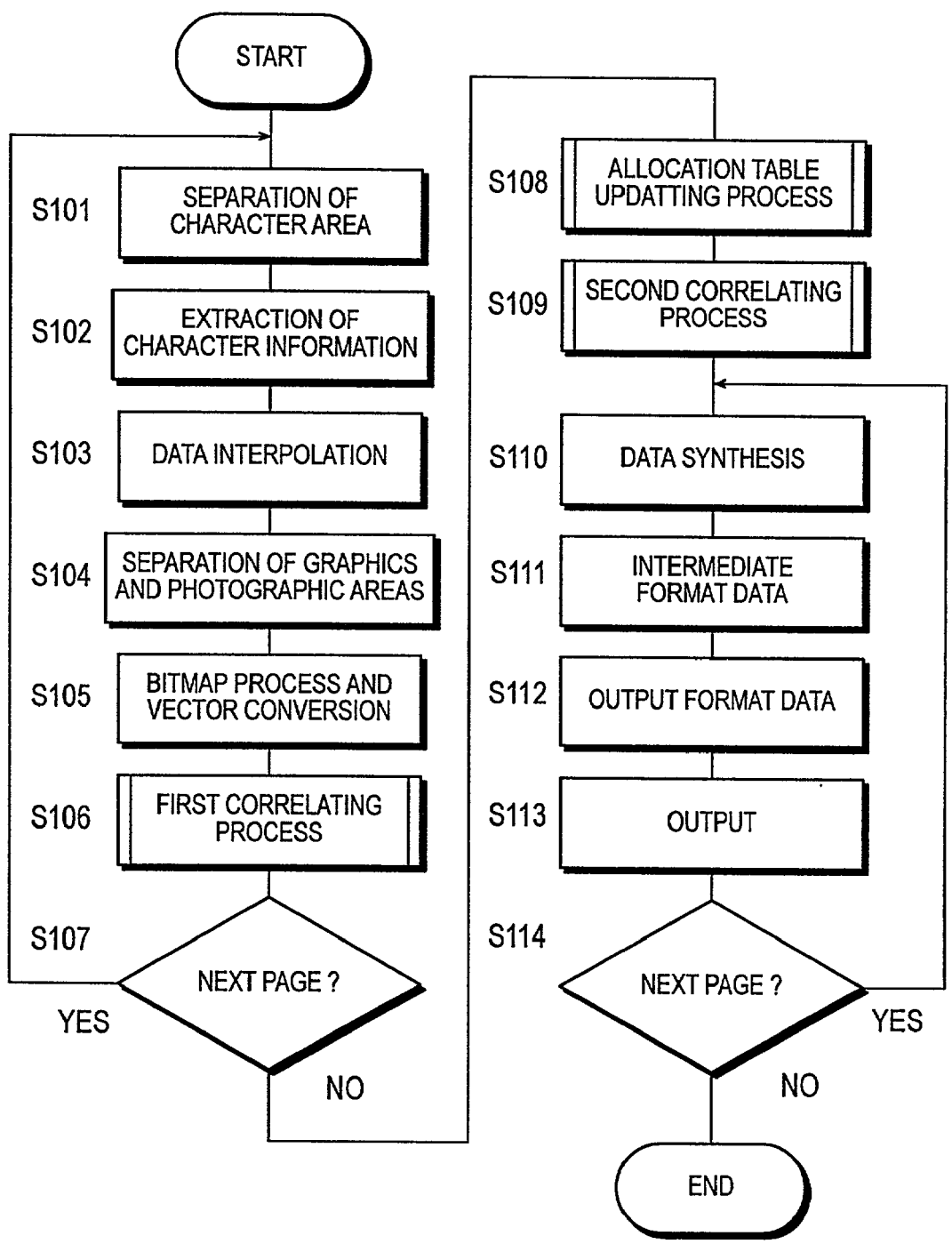
FIG. 10 is a flow chart of a consistency process of the second embodiment according to the invention.

Referring to a flowchart of FIG. 10, the consistency process in case of the 2-in-1 mode will be described below using input images shown in FIG. 5A and FIG. 5B as an example.

First, by executing the steps S101 through S107 similar to the first embodiment, the allocation table shown in FIG. 6A and FIG. 6B is obtained before the image data is integrated, i.e., before the layout is changed.

After that, an allocation table updating process is executed (step S108). The allocation table updating process is a process of correcting the data set at the allocation table in accordance with the correction of data such as the changes of positional information due to the layout change process.

Next, the second correlating process is executed to obtain the final allocation table to be used for data synthesizing (step S109). By executing the steps S110 through S114 similar to the first embodiment, an output image having groups of consistent captions and page number identification descriptions is obtained.

As can be seen from the above, the consistency process according to the second embodiment is essentially identical to the consistency process of the first embodiment except the allocation table updating process.

Figure 11:
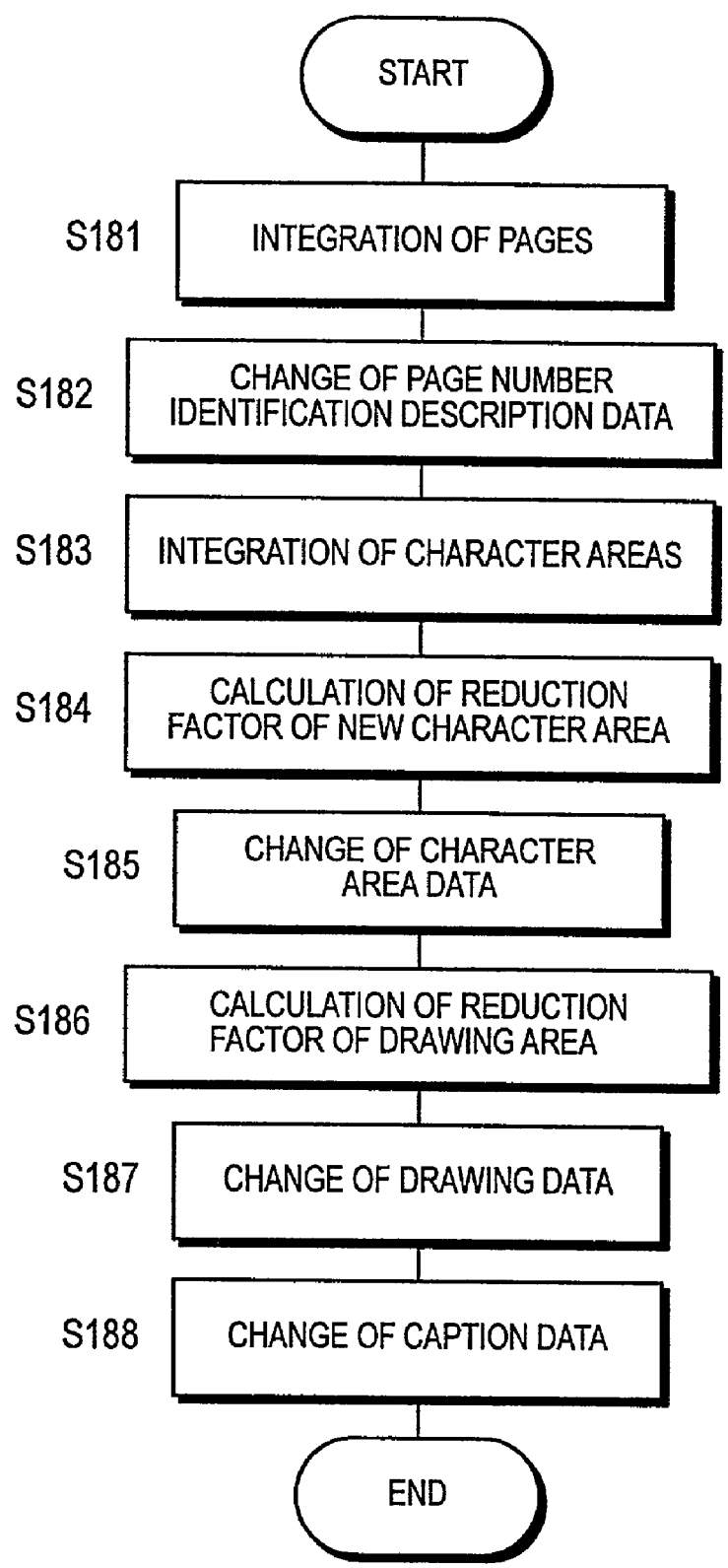
FIG. 11 is a flow chart of an updating process to an allocation table in the consistency process.

Next, the updating process of the allocation table will be described in detail referring to the flow chart shown in FIG. 11.

First, the data of the detected character string 72, which is the page number identification description of FIG. 5B, is deleted from the first memory area, and the memory address Padr2 and the positional information of the detected character string 72 are removed from the allocation table (step S181). Consequently, the data of the even number page moves to the odd page immediately before it and the data of the two pages are integrated as the data for one page.

After that, in order to make the position of the detected character string 71 correspond with the layout setting, the data of the detected character string 71 stored in the first memory area is changed and the positional information in the page number section is corrected (step S182).

Next, the data of the character areas 101 through 103 are integrated (step S183), and the reduction factor for the new character area 104 where the integrated data is to be placed is calculated (step S184). The data of the character areas 101 through 103 stored in the fourth memory area are changed based on the reduction factor and the layout setting, and the memory addresses Cadr1, Cadr5, Cadr7 and the positional information in the text section are changed (step S185).

The data for the insertion character strings 101A through 101C, 102A, 103A and 103B are simultaneously changed, and the memory addresses Cadr2 through Cadr4, Cadr6, Cadr8 and Cadr9 and positional information in the insertion section are corrected. The addresses after correction are indicated by Cadr1' through Cadr9'.

Then, the reduction factor of the area where drawings 91 through 95 are located, i.e., the drawing area, is calculated (step S186). Then, the data of the drawings 91 through 95 stored in the third memory area are changed based on the reduction factor and the layout setting, and the memory addresses and the positional information in the drawing section is changed (step S187). The addresses after correction are indicated by Fadr1' through Fadr5'.

With the change of the data of drawings 91 through 95, the data of the captions stored in the second memory area are changed, and the memory addresses and the positional information of the caption section are corrected (step S188). The addresses after correction are indicated by Nadr1' through Nadr5'.

Figure 14:
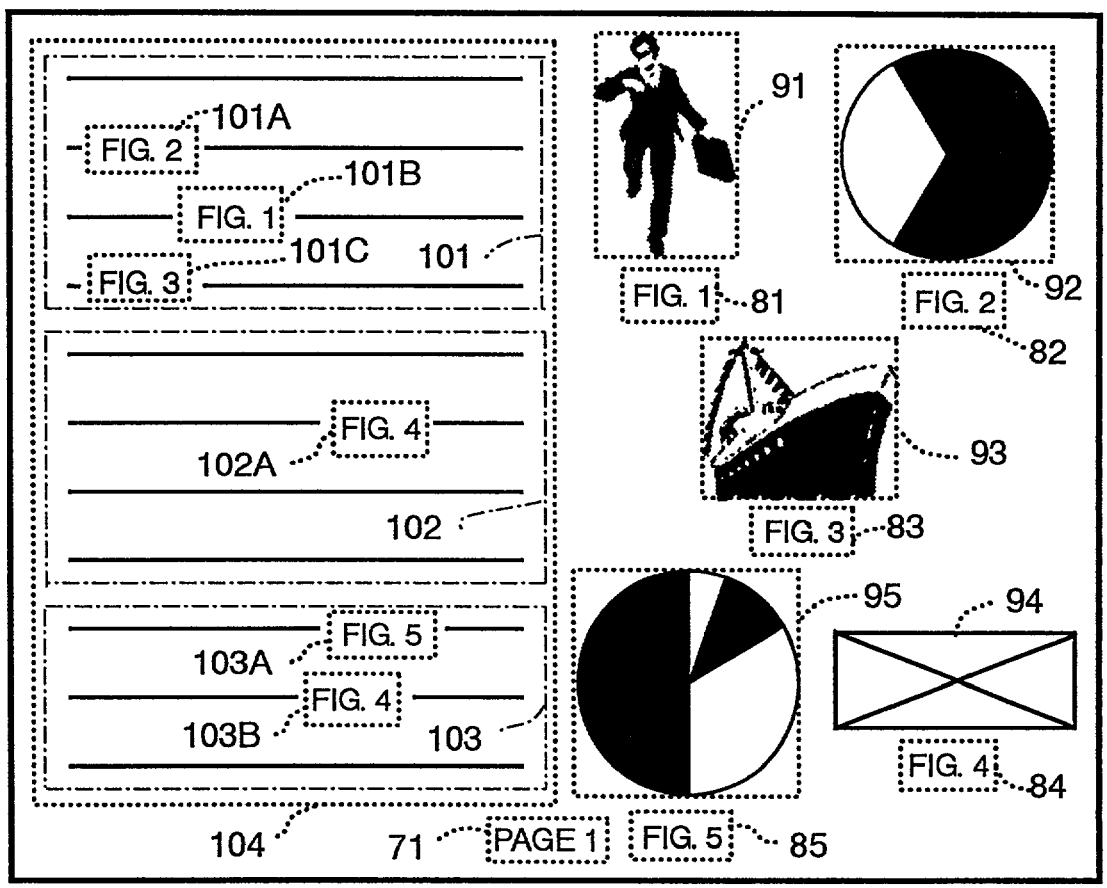
FIG. 14 is an example output image, to which the consistency process is applied.

Consequently, the data of the allocation table shown in FIG. 6A and FIG. 6B are updated, and a new allocation table shown in FIG. 12A and FIG. 12B is obtained. After that, the second correlating process is executed and groups of page number identification descriptions and drawing identification descriptions are allocated to the updated allocation table as show in FIG. 13A and FIG. 13B. By reading the data out of the memory 17 and synthesizing them based on the allocation table, an output image having groups of consistent captions and page number identification descriptions is obtained as shown in FIG. 14.

In the second embodiment, as can be seen from the above, the groups of page number identification description and drawing identification descriptions are corrected to avoid overlapping.

It is obvious that this invention is not limited to the particular embodiments shown and described above but may be variously changed and modified without departing from the technical concept of this invention.

For example, the allocation of the groups of page number identification descriptions and drawing identification descriptions can not only be applied in the numbering method of the ascending order, but also is applicable in the numbering method of the descending order or in a arbitrary order as long as it is unique.

Moreover, the allocation of the groups of page number identification descriptions and drawing identification descriptions is not limited to the numbers alone. For example, it is possible to apply to the group of page number identification descriptions a combination notation consisting of a number and an alphabetic character such as "1A" and "1B" or a combination of a character string meaning "page" and a number such as "P. 1" and "P. 2" or "PAGE 1" and "PAGE 2."

Similarly, it is possible to apply to the group of drawing identification descriptions a combination notation consisting of a number and an alphabetic character such as "1A" and "1B" or a combination of a character string meaning "drawing" and a number such as "FIG. 1" and "FIG. 2" or "FIG. 1" and "FIG. 2."

The invention is applicable not only to a system including a plurality of apparatuses, but also to standalone equipment such as digital copying machines.

It is also possible to make a computer function as an image processing apparatus by providing a program product containing the code data of the programmed image processing method. Such a program product includes a program itself and a storage medium that contains the program.

What is claimed is:

1. An image editing method comprising the steps of:
   (a) receiving first document data and second document data obtained by reading respectively a first document and a second document each having at least one drawing and a drawing number located in the vicinity of the drawing;
   (b) recognizing the drawing numbers from image data in the first document data and image data in the second document data;
   (c) changing corresponding data in the first document data and the second document data so that the recognized drawing numbers differ from each other; and
   (d) printing an image based on the changed first and second document data.

2. An image editing method as claimed in claim 1, in which said drawing numbers recognized in said step (b) include those that are referenced in texts of the documents.

3. An image editing method as claimed in claim 1, in which said corresponding data of the first document data and the second document data are changed so that the recognized drawing numbers become serial in said step (c).

4. An image editing method comprising the steps of:
   (a) receiving first document image data and second document image data obtained by reading respectively a first document and a second document each having a page number printed;
   (b) recognizing the page numbers from the first document image data and the second document image data;
   (c) changing corresponding data in the first document image data and the second document image data so that the recognized page numbers differ from each other; and
   (d) printing an image based on the changed first and second document image data.

5. An image editing method as claimed in claim 4, in which said corresponding data of the first document data and the second document data are changed so that the recognized page numbers become serial in said step (c).

6. An image processing apparatus comprising:
   a receiving unit for receiving first document image data and second document image data obtained by reading respectively a first document and a second document each having at least one drawing;
   an extraction means for extracting a first caption group for identifying the drawing contained in the first document and a second caption group for identifying the drawing contained in the second document; and
   a conversion means for converting the first caption group and the second caption group into a third caption group so that a character string in the first caption group and a character string in the second caption group are different from each other such that the third caption group identifies the drawing in the first document with a different identifier than is used to identify the drawinci in the second document.

7. An image processing apparatus as claimed in claim 6, in which said conversion means further converts character strings contained in the first document and the second document, which are identical to character strings that belong to the first caption group and the second caption group, into character strings that belong to the third caption group.

8. An image processing apparatus as claimed in claim 6, in which said extraction means recognizes a character string appended in the vicinity of the drawing as a caption based on positional information of the drawing and the character string.

9. An image editing apparatus comprising:
 a receiving unit for receiving first document image data and second document image data obtained by reading respectively a first document and a second document each having at least one drawing;
 a recognizing means for recognizing drawing numbers from the first document image data and the second document image data;
 a changing means for changing corresponding data in the first document image data and the second document image data so that the recognized drawing numbers do not overlap each other; and
 a printing unit for printing an image based on the changed first and second document data.

10. An image editing apparatus as claimed in claim 9, in which said recognizing means recognizes drawing numbers referenced in texts of the documents.

11. An image editing apparatus as claimed in claim 9, in which said changing means changes the corresponding data of the first document image data and the second document image data so that the recognized drawing numbers become serial.

12. A computer readable medium having an image editing program for causing a computer to execute the procedures of:
 (a) receiving first document image data and second document image data obtained by reading respectively a first document and a second document each having at least one drawing and a drawing number located in the vicinity of the drawing;
 (b) recognizing the drawing numbers from the first document image data and the second document image data;
 (c) changing corresponding data in the first document image data and the second document image data so that the recognized drawing numbers differ from each other; and
 (d) printing an image based on the changed first and second document image data.

13. A computer readable medium having an image editing program as claimed in claim 12, in which said drawing numbers recognized in said procedure (b) include those that are referenced in texts of the documents.

14. A computer readable medium having an image editing program as claimed in claim 12, in which said corresponding data of the first document image data and the second document image data are changed so that the recognized drawing numbers become serial in said procedure (c).

15. An image processing apparatus comprising:
 a receiving unit for receiving first document image data of a first document and second document image data of a second document, the first document and the second document each having at least one drawing;
 an extraction unit for extracting a first caption group for identifying the drawing contained in the first document and a second caption group for identifying the drawing contained in the second document; and
 a conversion unit that is adapted to convert the first caption group and the second caption group into a third caption group so that a character string in the first caption group differs from a character string in the second caption group such that the third caption group identifies the drawing in the first document with a different identifier than is used to identify the drawing in the second document.

16. An image processing apparatus as claimed in claim 15, in which said conversion unit further converts character strings contained in the first document and the second document, which are identical to character strings that belong to the first caption group and the second caption group, into character strings that belong to the third caption group.

17. An image processing apparatus as claimed in claim 16, in which said extraction unit recognizes a character string appended in the vicinity of the drawing as a caption based on positional information of the drawing and the character string.

18. An image editing apparatus comprising:
 a receiving unit for receiving first document image data a first document and second document image data a second document, the first document and the second document each having at least one drawing;
 a recognizing unit for recognizing drawing numbers from the first document image data and the second document image data;
 a changing unit adapted to change corresponding data in the first document image data and the second document image data so that the recognized drawing numbers differ from each other; and
 a printing unit for printing an image based on the changed first and second document data.

19. An image editing apparatus as claimed in claim 18, in which said recognizing unit recognizes drawing numbers referenced in texts of the documents.

20. An image editing apparatus as claimed in claim 18, in which said changing unit changes the corresponding data of the first document image data and the second document image data so that the recognized drawing numbers become serial.

21. An image editing apparatus comprising:
 a receiving unit for receiving first document image data a first document and second document image data a second document, the first document and the second document;
 a recognizing unit for recognizing page numbers from the first document image data and the second document image data;
 a changing unit adapted to change corresponding data in the first document image data and the second document image data so that the recognized page numbers differ from each other; and
 a printing unit for printing an image based on the changed first and second document data.

22. An image editing method as claimed in claim 21, in which said corresponding data of the first document data and the second document data are changed so that the recognized page numbers become serial in said step (c).

* * * * *